United States Patent [19]

Knudson

[11] 3,735,339
[45] May 22, 1973

[54] SAFETY SYSTEM FOR VISUAL APPROACH

[75] Inventor: Clarence B. Knudson, Inglewood, Calif.

[73] Assignee: Hughey and Phillips, Inc., Burbank, Calif.

[22] Filed: Nov. 15, 1971

[21] Appl. No.: 198,509

[52] U.S. Cl. ................................................. 340/25
[51] Int. Cl. ............................. B64f 1/18, G08g 5/02
[58] Field of Search ............................... 340/25, 26; 200/61.51, 61.52; 317/141 R; 307/141, 141.8, 141.4

[56] References Cited

UNITED STATES PATENTS 3,701,969  10/1972  Lambert et al. ....................340/25

Primary Examiner—Kathleen H. Claffy
Assistant Examiner—Thomas L. Kundert
Attorney—Bruce L. Birchard

[57] ABSTRACT

An improved safety system for visual approach slope indicator installations at airports is described which does not disable the installation when transient displacements of the key visual elements occur but does disable the installation when long term displacements of the key visual elements occur in such magnitude as to make dangerous reliance on the installation by the pilot of an approaching aircraft.

8 Claims, 2 Drawing Figures

PATENTED MAY 22 1973 3,735,339

INVENTOR.
CLARENCE B. KNUDSON
BY Bruce L. Birchard
ATTORNEY

SAFETY SYSTEM FOR VISUAL APPROACH

RELEVANT COPENDING APPLICATION

Application Ser. No. 198,506 filed Nov. 15, 1971 entitled Intensity Control Circuit for Visual Approach Slope Indicator Installation.

BACKGROUND OF THE INVENTION

To maintain and improve the high standards of safety in the aeronautics industry of the United States the Federal Aviation Agency, which is charged with the safety of air travel in the United States, has approved and required the installation of an aircraft approach system designated by the acronym VASI. VASI stands for Visual Approach Slope Indicator. It is a visual system supplementing ILS (Instrument Landing System) for those aircraft equipped with ILS receivers and indicators and supplying an accurate slope indicator for those aircraft, usually the privately owned aircraft, having no electronic landing approach slope indicating equipment. For the smaller airports with limited traffic an alternative but related system called SAVASI is available. The first two letters of that acronym stand for Simple Abbreviated.

The principle of operation of VASI and SAVASI, although not directly part of this invention requires some explanation to appreciate the full import of the invention claimed herein. The full details of VASI can be found in Handbook 6850.2 published by the Federal Aviation Administration, U. S. Department of Transportation. In its simplest form two light sources (called "bars") are located adjacent to but at a safe distance from the center line of the runway to be used and are spaced along the runway at critical distances to be described. The bar nearest the landing threshold of the runway is called the "downwind" bar, and that further along the runway is described as the "upwind" bar.

Each bar includes one or more lamp housings. Each lamp housing in a bar contains three 200 watt 6.6 ampere pre-focussed halogen cycle lamps and three sets of red and white spread lenses which produce well defined red and white beams of light having known half-power widths in a vertical plane and in the horizontal plane. For example, the half-power width of the vertical radiation pattern for the white beam is approximately 2°. The crossover point between the white and red beams is also pre-determined and set with great accuracy.

The white beam lies above the red beam in both the upwind and downwind light bars. This is achieved by the spread lens filter in front of each lamp in the light bar. The upper portion of each such lens is red and the lower portion is clear. The lenses also spread the light horizontally.

In addition to the critical location of the upwind and downwind bars along the runway the aiming of these bars is critical. As has been noted the light beams are narrow and in order to provide a safe glide slope path that can be relied upon by a pilot making a landing approach the corridor must be accurately defined.

When the positioning and aiming of the light bars are correct and the pilot is on the right glide path the downwind bar or bars will appear white while the upwind bars appear red. If the approach is too high, both downwind and upwind bars appear white, while an approach which is too low results in both bars appearing red.

To prevent the generation of erroneous descent information and possible death or injury to those aboard an aircraft the Federal Aviation Administration has set some very stringent specifications on the aiming of the light bars and has further defined acceptable tolerances. They further have required that the light bars be equipped with tilt-switches that will disable both light bars in a two bar (one lamp box per bar) system in the event the aiming of either bar changes by ½° below or 1° above the correct pre-set aiming angle.

Deviations from the pre-set aiming angle of a light bar can be of a long term or short term nature. For example, if the light bar is physically struck, as by a field maintenance vehicle, the bar may suffer permanent displacement and the aiming angle may be permanently lost until re-setting is accomplished. This is the type of error the tilt-switch is intended to eliminate. On the other hand, temporary deviation of the light bar from the proper aiming angle may result from the shock waves produced by jet engine operation in close proximity to the light bar. This transient type of deviation should not produce shut-down of the VASI system. The FAA has set the vibration which must be tolerated by the VASI safety system without breaking the light bar electrical circuit as follows. The safety system must withstand vibration of 1 inch amplitude at frequencies from one-half cycle per second to 10 cycles per second for 10 minutes without shutting off power to the light bars. At the same time a sustained tilt for a maximum of 1.5 minutes must shut off the power to the VASI light bars. The FAA specifications further provide that the safety system shall operate from −55° to +55° C. Further, it is desirable that the tilt-sensing system operate from normally closed contacts so as to be fail-safe.

Various methods have been proposed to provide the safety system required by the FAA for VASI. For example, it has been proposed that a pendulum be used which will move from a neutral position corresponding to proper light bar tilt angle to a deviated position when the light bar tilt angle deviates from its pre-set position and such pendulum causes the closing of electrical contacts which deactivate the VASI system. Such an approach would not meet the vibration tolerance specifications set by the FAA nor the desired fail-safe requirements.

In the safety system which constitutes the present invention a pair of thallium-doped mercury switches is incorporated in adjustable fashion in each of the light bar housings. The purpose of the thallium in the mercury is to lower the freezing point of the mercury so that the system meets the −55° C specification set by the FAA. This is a well established technique and, by itself, does not constitute the invention claimed herein.

The two mercury switches are individually adjusted so that when the housing is level and the light beams are properly aimed the switch contacts are closed but when the light bar is tilted more than 1° upward plus 0° minus ¼° or tilts downward ½° plus 0° minus ¼° one or the other of the switches opens which would disable the VASI system instantaneously except for the novel associated electronic circuit which delays such disabling until it is clear that the light bar tilting is long term in character. The safety system will operate if either the upwind or downwind light bar is permanently tilted and the VASI system will be disabled. However, tilting or vibration of either of those light bars by wind gusts, jet blasts or any other transient phenomena will not disable the VASI system.

DETAILED DESCRIPTION OF THE ILLUSTRATED EMBODIMENT

Figure 1:
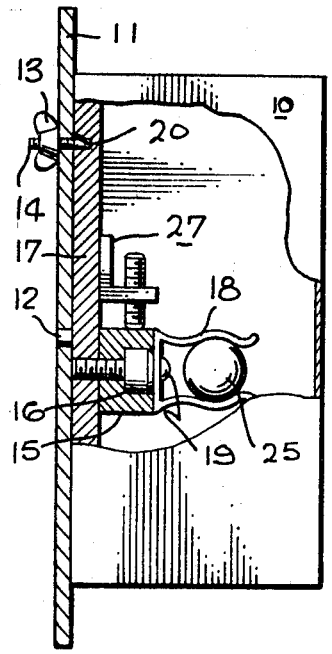

In FIG. 1, tilt-switch module 10 is shown mounted in selectively rotatable position to mounting plate 11 which may be one panel of a lamp housing, by means of pivot 12 and wing-nut 13 which is applied to threaded bolt 14. Threaded bolt 14 has one end secured to tilt-switch module 10 and passes through arched slot 20 (FIG. 2) in mounting plate 11. Clip-mounting bar 15 has fulcrum screw 16 passing centrally therethrough and securing bar 15 in snugly rotatable fashion to backplate 17. Clip 18 is secured in fixed fashion to mounting bar 15 by means of screw 19.

Figure 2:
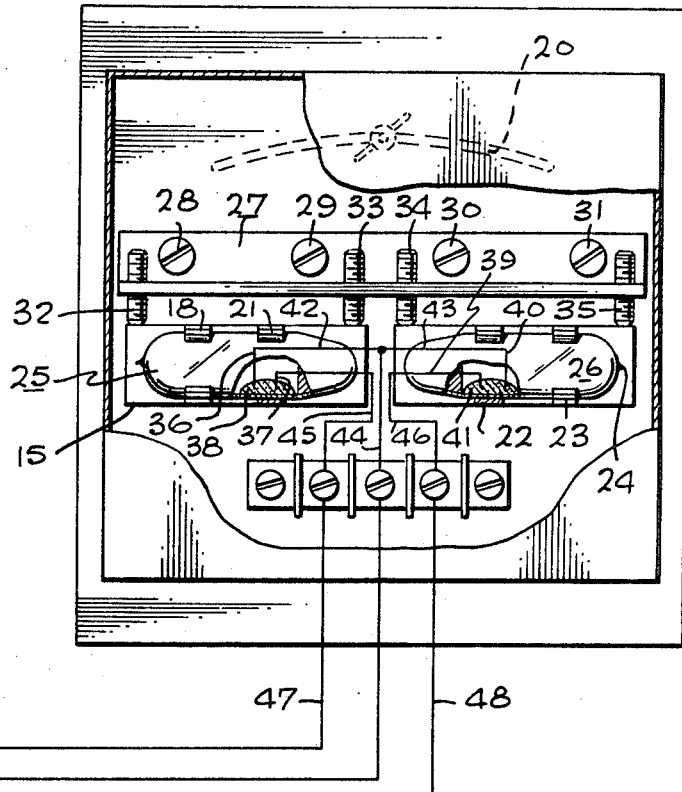
Figure 2:
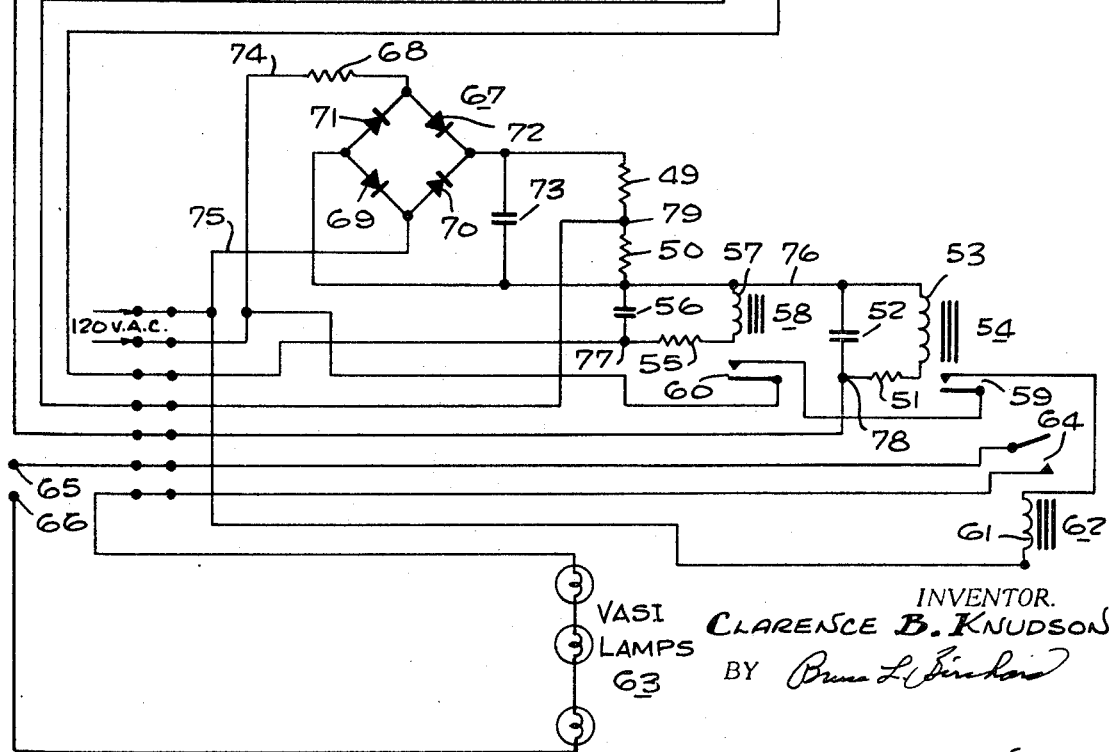

Similarly, in FIG. 2 clips 18, 21, 22 and 23 are fixed to mounting bars 15 and 24, respectively. Mercury-thallium switches 25 and 26 are secured in removable fashion but with fixed orientation in clips 18, 21 and 22, 23, respectively.

L-bar 27 which is secured with fixed orientation to backplate 17 by means of screw 28, 29, 30 and 31 carries pre-tilt adjustment screws 32, 33, 34 and 35. Mercury-thallium switch 25 includes electrodes 36 and 37, and mercury-thallium mass 38. Mercury-thallium switch 26 includes electrodes 39 and 40, and mercury-thallium mass 41. Output leads 42 and 43 from mercury-thallium switches 25 and 26, respectively, are connected together and to conductor 44. Output leads 45 and 46 from switches 25 and 26, respectively, are connected to conductors 47 and 48, respectively. Conductor 44 is connected to junction 79 of resistors 49 and 50. Conductor 47 is connected to junction 78 of resistor 51 and condensor 52 which shunt pull-in winding 53 of relay 54. Conductor 48 is connected to junction 77 of resistor 55 and condenser 56 which shut pull-in winding 57 of relay 58. Normally open contacts 59 and 60 of relays 54 and 58, respectively, are connected in series with pull-in coil 61 of power relay 62 across the power source, which in this case is a 120 volt A. C. line. VASI lamps 63 are connected in series with normally open relay contacts 64 across terminals 65 and 66 which are connected to a lamp power source such as that described in copending application Ser. No. 198,506 in the name of Robert H. Horner, assigned to the same assignee as this application. D. C. power for operating relays 58 and 54 is provided from power supply 67 comprising resistor 68, diodes 69, 70, 71 and 72 connected in a bridge configuration and filter capacitor 73 in combination with resistors 49 and 50. A. C. power to be rectified is applied across the bridge rectifier through conductors 74 and 75 and resistor 68.

The safety system of the present invention operates as follows. At the outset the VASI lamps 63, which may be in the same external housing as the tilt-switch module 10, are oriented horizontally and pre-tilted or aimed in the elevation plane to provide the desired aircraft visual approach path. This will likely result in tilt-switch module 10 being tilted off the horizontal. To compensate for this tilt and to bring L-bar 27 into a horizontal position wing-nut 13 is loosened and module 10 is rotated about pivot 12 until the upper surface of module 10, and hence, L-bar 27 is absolutely level or horizontal. Bolt 14 moves in slot 20 during this set-up procedure and when the upper surface of module 10 is level wing-nut 13 is tightened to secure the module in that position.

Pre-tilt adjustment screws 32 and 33 are adjusted so that mounting bar 15 is tilted approximately two-thirds of a degree downward toward the end depressed by pre-tilt adjustment screw 33. Rotation is about fulcrum screw 16. Pre-tilt adjustment screws 34 and 35 are adjusted so that mounting bar 24 is tilted approximately three-eighths of a degree downward towards the end engaged by pre-tilt adjustment screw 34. Rotation of mounting bar 24 is about a fulcrum screw, not shown, centrally located in mounting bar 24 as fulcrum screw 16 is located in mounting bar 15. The orientation of the mounting bars just described assumes that the mounting bars lie in a plane having a direction parallel to a vertical plane bisecting the light beam emanating from the VASI lamps and that the lamps are radiating to the right of the tilt switch module as shown in FIG. 2.

The respective pre-tiltings of mounting bars 15 and 24, as just described, result in the breaking of the electrical circuit through mercury-thallium switch 25 if the VASI lamps 63 are deflected upward 1 degree and the opening of mercury-thallium switch 26 if the VASI lamps 63 are deflected downward by one-half degree.

Going through a cycle of operation, when VASI lamps are properly directed along a predetermined tilt or aiming line so as to provide proper aircraft visual approach information and there are no external transient vibrational forces being applied to the assembly including module 10 and VASI lamps 63, mercury-thallium switches 25 and 26 are closed applying a D. C. potential to junction 77 between resistor 55 and condenser 56 and junction 78 between resistor 51 and condenser 52, respectively, charging condensers 56 and 52 through resistor 49, conductor 76 being the common or negative side of D. C. power supply 67.

When transient vibrational forces having magnitudes sufficient to produce vibrations of the VASI lamps and tilt-switch module 10 up to 1 inch in amplitude at frequencies from one-half cycle per second to 10 cycles per second, mercury-thallium switches 25 and 26 open alternately removing the D. C. potential from junctions 77 and 78, respectively. Relay contacts 59 and 60 do not open instantaneously, however, because of the discharge of condensers 52 and 56, respectively through resistors 51 and 55 and pull-in windings 53 and 57, respectively. The time for such discharge exceeds the time mercury-thallium switches 25 and 26 are open as a result of transient vibrations which have been described. As a result power to pull-in winding 61 of power relay 62 is not interrupted and the VASI lamps 63 continue to operate. On the other hand, if the aiming angle or desired tilt of VASI lamps 63 is significantly disturbed on a steady state basis for in excess of a maximum of 1.5 minutes either mercury-thallium switch 25 or 26 will open and the potential will be removed from either junction 77 or 78. The corresponding condenser will discharge through its associated pull-in winding in a time determined by the magnitude of its associated resistor 55 or 51, respectively. The discharge of condensor 56 or 52 will result in a cessation of current flow through pull-in windings 57 or 53, respectively, and contacts 60 or 59 will open interrupting the flow of current through pull-in coil 61 of relay 62, contacts 64 will open and VASI lamps 63 will be extinguished.

As described earlier in this specification the VASI system comprises a minimum of two light bars spaced upwind and downwind along a runway. If either light bar suffers a long term deflection from its predetermined aiming angle, it is essential that both light bars or sets of VASI lamps be extinguished so that a pilot will not have erroneous approach information. One light bar and its associated safety system have been described. Additional light bars have corresponding tilt-switch modules and associated circuits to assure extinguishment of the lghts in the light bar when a long-term displacement occurs but not when a short term displacement from a transient phenomenon occurs. To make each light bar's operation dependent not only on its own proper aiming angle but also on the proper aiming angle of any associated light bar it is only necessary to place the pull-in windings of the power relays in the respective light-bar assemblies, such as pull-in winding 61 of relay 62, in series with each other and with the contacts 59 and 60 and their counterparts in the other light bar assemblies, across a source of A. C. power instead of connecting the pull-in coil of each power relay through only its associated relay contacts, such as 59 and 60, of its local tilt-sensing circuit directly to an A-C power source, as shown in FIG. 2. Thus if any light bar assembly is deflected on a long term basis from its desired tilt or aiming direction the tilt-switch module in that assembly will cause the pull-in current for the power relay in that assembly and in any other inter-connected assemby to be interruptd, the contacts on that relay and on all other inter-connected power relays will be opened and the current to both the local VASI lamps and those in the other light bar or light bars will be interrupted assuring that approaching aircraft will not be given erroneous visual glide path information. At the same time because of the controlled reaction time of the relays such as relays 54 and 58 transient displacement arising from vibration of the light bars during jet blasts or the like will not cause disabling of the VASI lamps and the visual approach system will continue to be available to pilots landing at the airport.

A suggested set of component values for the circuit of FIG. 2 are as follows:

| | |
|---|---|
| Resistor 68 | 1.2K ohms |
| Resistor 49 | 1.5K ohms |
| Resistor 50 | 7.5K ohms |
| Resistor 51 | 7.5K ohms |
| Resistor 55 | 7.5K ohms |
| Condensor 73 | 93 microfarads |
| Condensor 56 | 100 microfarads |
| Condensor 52 | 100 microfarads |

While a particular embodiment has been described, modifications may be made within the scope of the invention. The following claims are intended to cover such embodiments.

What is claimed is:

1. An airport runway visual approach slope indicator including light bar means aimed at predetermined tilt angles and a safety system; a first set of terminals for providing electrical current to said light bar means; a second set of terminals for providing operating power to said safety system; said safety system including electrical switches, sensitive to their angles of tilt, physically associated with said light bar means and responsive to short term or long term changes in said tilt angles of said light bar means to open or close the electrical current paths through said electrical switches; at least one D. C. power source, first relay means, including a plurality of relays and second relay means associated with said light bar means; said first relay means being coupled between said at least one D. C. power source and said electrical switches and having first and second conditions; said second relay means being coupled to said first relay means and being responsive to said first condition thereof to couple said first set of terminals to said light bar means and being responsive to said second condition thereof to disconnect said light bar means from said first set of terminals; and time delay means coupled to said first relay means to prevent changing thereof from said first condition to said second condition in response to the opening of any of said electrical switches for less than a predetermined period of time.

2. Apparatus according to claim 1 in which said time delay means comprises the serial combination of a resistor and a condensor shunting each of the relays in said first relay means.

3. Apparatus according to claim 2 in which said electrical switches each have a pre-adjusted initial tilt angle off the horizontal.

4. Apparatus according to claim 3 in which said electrical switches are thallium-doped mercury switches.

5. Apparatus according to claim 1 in which said electrical switches are two in number, one being responsive to excessive upward tilt of said light bar means the other being responsive to excessive downward tilt of said light bar means to open the electrical circuit through the respective one of said switches; said first relay means comprising two D. C. operated relays each having a set of contacts and a pull-in coil each said pull-in coil being serially coupled through its respective one of said electrical switches to said at least one D. C. power source; said second relay means including a pull-in coil and at least one set of contacts; said pull-in coil of said second relay means being connected serially with said set of contacts of each of said D. C. relays in said first relay means across said second set of terminals; said at least one set of contacts of said second relay means being connected in series with said light bar means across said first set of terminals.

6. Apparatus according to claim 1 in which said light bar means includes two light bars separated from each other a predetermined distance along an airport runway, each said light bar having a pre-set tilt angle; said safety system including a pair of mercury-thallium switches mounted each with a predetermined initial tilt angle in mechanical connection with each of said light bars; a D. C. power source associated with each light bar; said first relay means including first and second D. C. operated relays associated with each light bar, each said relay having a pull-in coil connected through a respective one of said mercury-thallium switches to said D. C. power cource associated with its respective light bar and each said relay having a set of normally open contacts; said second relay means including a power relay associated with each of said light bars, each said power relay having a pull-in coil and at least one set of normally open contacts; said second set of terminals being adapted for the application of A. C. voltage thereto and being connected serially through said contacts of said first and second D. C. operated relays to said pull-in coil of the power relay associated with the corresponding light bar; said at least one set of normally open contacts of each of said power relay being connected in series between said first set of terminals and said two light bars.

7. Apparatus according to claim 6 in which one of said mercury-thallium switches has a predetermined tilt angle so as to make it responsive to an upward change of 1° in said tilt angle of said light bar means to open the electrical circuit therethrough and the other of said mercury-thallium switches is responsive to a downward change of ½° in said tilt angle of said light bar means to open the electrical circuit therethrough.

8. Apparatus according to claim 1 in which said time delay means produces a delay of at least 1 second in the changing of said first relay means from said first condition to said second condition.

* * * * *